United States Patent [19]

Hegman

[11] Patent Number: 5,186,274

[45] Date of Patent: Feb. 16, 1993

[54] MOTORCYCLE FRONT FENDER MOUNTING SYSTEM

[75] Inventor: Terry Hegman, Fountain Valley, Calif.

[73] Assignee: Harley-Davidson, Inc., Milwaukee, Wis.

[21] Appl. No.: 627,307

[22] Filed: Dec. 14, 1990

[51] Int. Cl.$^5$ ............................................. B62K 25/08
[52] U.S. Cl. ................... 180/227; 280/276; 280/277; 280/152.1; 280/157; 293/105
[58] Field of Search ............ 280/277, 275, 276, 152.1, 280/152.2, 152.3, 156, 157, 160.1, 279, 852; 180/219, 227; 293/102-105, 141; D12/186, 184

[56] References Cited

U.S. PATENT DOCUMENTS

| | | | |
|---|---|---|---|
| 980,999 | 1/1911 | Pommer | 280/276 |
| 1,144,763 | 6/1915 | Budroe | 280/277 |
| 1,189,874 | 7/1916 | Schickel | 280/277 |
| 1,227,634 | 5/1917 | Lake | 280/276 |
| 1,527,133 | 2/1925 | Harley | 280/277 |
| 2,485,484 | 10/1949 | Dean | 280/277 |
| 2,537,679 | 1/1951 | Kraeft | 280/277 |
| 2,660,455 | 11/1953 | Douglas et al. | 280/277 |
| 4,184,695 | 1/1980 | Roe et al. | 280/277 |
| 4,295,658 | 10/1981 | Kashima | 280/276 |
| 4,422,662 | 12/1983 | Inoue et al. | 280/276 |
| 4,576,393 | 3/1986 | Moulton et al. | 280/276 |
| 4,775,163 | 10/1988 | McGowan | 280/277 |
| 5,026,083 | 6/1991 | Wendorf | 280/277 |

FOREIGN PATENT DOCUMENTS

| | | | |
|---|---|---|---|
| 0507753 | 12/1951 | Belgium | 280/277 |
| 0078891 | 2/1949 | Czechoslovakia | 280/277 |
| 0387305 | 7/1908 | France | 280/277 |
| 0467213 | 6/1914 | France | 180/219 |
| 1024535 | 4/1953 | France | 280/277 |
| 1059922 | 3/1954 | France | 280/277 |
| 0441304 | 1/1936 | United Kingdom | 280/152.1 |

Primary Examiner—Margaret A. Focarino
Assistant Examiner—Anne Boehler
Attorney, Agent, or Firm—Whyte & Hirschboeck

[57] ABSTRACT

A front fender mount for a motorcycle, having a fork and double struts, which maintains the fender at a constant spacing from the wheel axle regardless of the movement of the fork and struts relative to the axle. The mount includes a bracket fixed to the fender, one linkage pivotally interconnecting the bracket and the fork, and another linkage pivotally interconnecting the bracket and the struts. A brake caliper mounting interconnects the bracket and the motorcycle wheel axle.

8 Claims, 2 Drawing Sheets

MOTORCYCLE FRONT FENDER MOUNTING SYSTEM

FIELD OF THE INVENTION

The present invention generally relates to the safe positioning of the front fender of a motorcycle such as a HARLEY DAVIDSON ® Springer model motorcycle by mechanical means, preferably of brackets and linkage, to maintain a constant distance between the front wheel/tire and the inside surface of this fender such that hitting any size bump will not change this fender/wheel relationship.

BACKGROUND OF THE INVENTION

The Springer model HARLEY DAVIDSON motorcycle front fender has a tire outer diameter to inside of fender clearance of approximately three inches. This large clearance must be maintained on this model motorcycle because the fender is mounted to the moving portion of the front forks which when a bump is hit causes the fender clearance to decrease. In other words, the inside of the fender moves down towards the tread of the tire. If the inside of the fender touches the tire surface or the front wheel the wheel will lock up with the fender and the motorcycle will rotate or pivot over the front wheel throwing the rider. Therefore a large clearance must be maintained between the front tire and the fender. However, this large clearance is cosmetically objectionable and limits the size and tread configuration that can be used on this type of motorcycle.

SUMMARY OF INVENTION AND OBJECTS

The present invention overcomes the shortcomings of the prior art by providing a device, method and system which maintain the relationship between the front fender and the front wheel preferably of a "Springer" model HARLEY DAVIDSON motorcycle. This allows for changing front wheel tire size and maintaining a safe clearance between the front tire and front fender at all times. The aesthetic or ornamental appearance of the motorcycle is thus enhanced by a clean fender line close to the tire surface, instead of a large gap between fender and tire. In addition, the present invention will not allow contact between the front tire and front fender to occur. Additionally, the invention obviates the dangerous problem of front wheel fender "lock-up". Although the invention is particularly suited to a HARLEY DAVIDSON Springer brand motorcycle, it will also have applicability to other types which utilize a double/multiple high wheel suspension. Therefore the invention is not to be limited to "Springer" motorcycles.

DRAWINGS

Other objects and advantages of the present invention will become apparent from the following detailed description taken in conjunction with the attached drawings in which.

DETAILED DESCRIPTION

Figure 1:
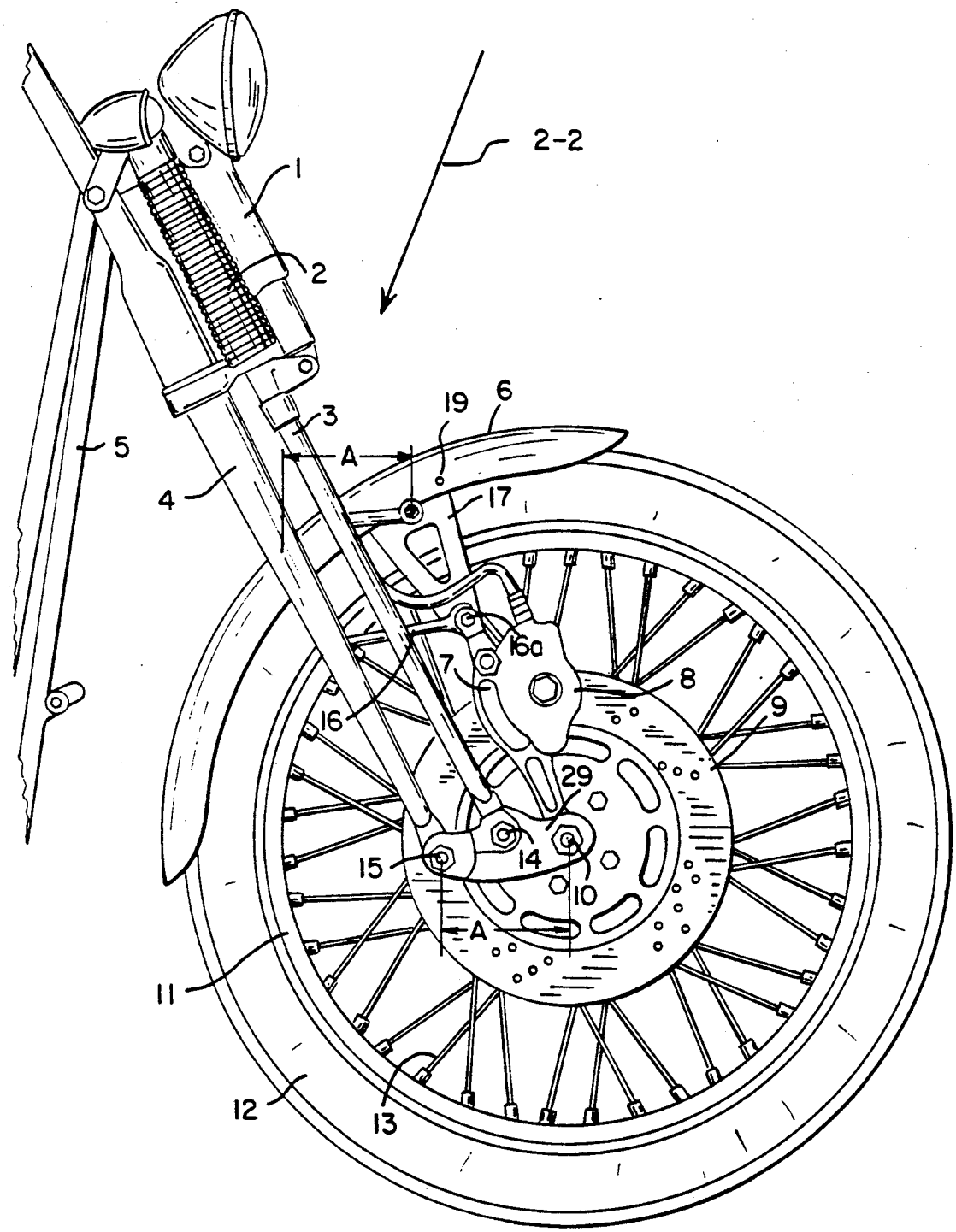
FIG. 1 is a side elevational view of the front forks and wheel of a HARLEY DAVIDSON Springer model motorcycle with lowered front fender, brackets and linkage system in accordance with a preferred embodiment of the invention.
Figure 2:
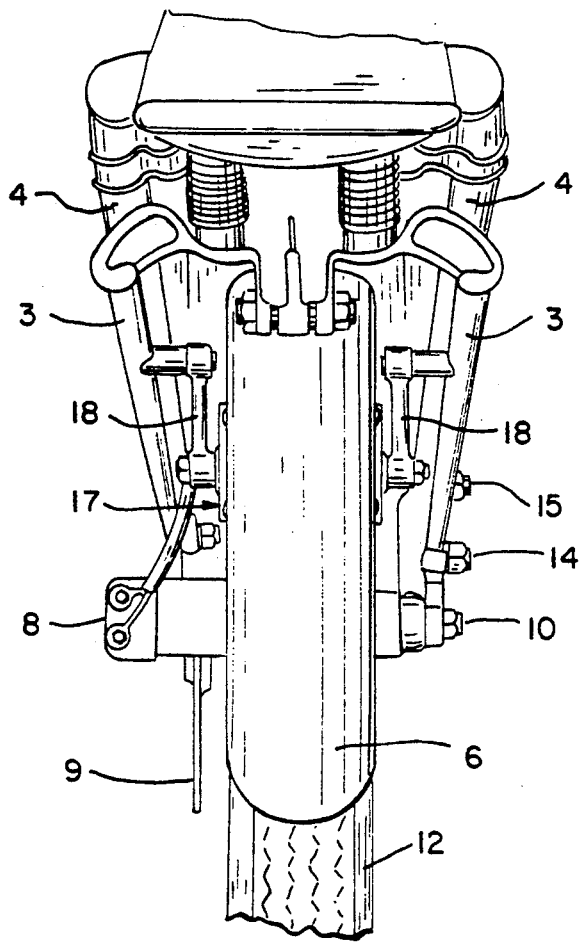
FIG. 2 is generally a top view of the assembly of FIG. 1 as seen generally along the arrow 2—2 of FIG. 1.

Referring to the drawings in detail there is illustrated for purposes of illustration only a HARLEY DAVIDSON Springer model, brand motorcycle incorporating a preferred embodiment of the present invention which includes a system for mounting the front fender 6 at a predetermined distance from the outer surface of the front tire 12 such that this distance is maintained even when the tire hits a bump or other obstacles when in use. The tire 12 itself is conventional and is of course mounted to a typical wheel 11 which is connected to a hub or rotor 9 by spokes 13 in a conventional fashion. The wheel assembly is mounted to and between the legs of fork 4 which is connected to the axle 10 of the wheel by connecting brackets 29 each having one end pivotally connected at 15 to the lower end of one of the fork legs 4 and an opposite end pivotally mounted about the axle 10 in conventional fashion. The motorcycle is also provided with a pair of struts 3 which act to compress springs 2 and actuate shock absorbers, respectively associated with the struts 3 as is conventional. The lower end of struts 3 are respectively pivotally mounted to the connecting brackets 29 between pivot 15 and axle 10 as clearly shown in FIG. 1.

The particular brand motorcycle shown also includes a brake caliper 8 connected to a mounting bracket 7 which is stabilized by an arm 16 which is pivotally connected at 16a in FIG. 1 to the bracket 7. The opposite end of stabilizing arm 16 is pivotally connected to one of the legs of fork 4. The caliper mounting bracket 7 is mounted about the axle 10 in conventional manner.

Figure 3:
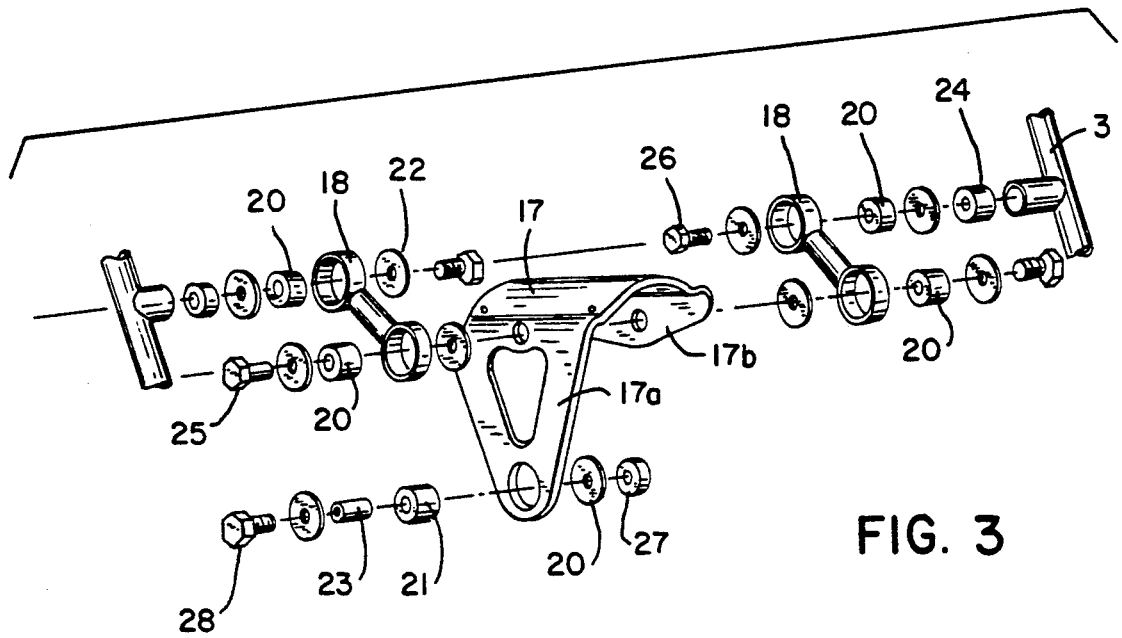
FIG. 3 is an exploded perspective view of the front fender bracket and linkage system excluding the motorcycle.

In accordance with the present invention, the fender mounting system includes in the preferred embodiment a bracket 17 fixed to the fender 6 preferably on the inner surface thereof. Bracket 17 has a pair of depending legs one 17a being longer than the other 17b as best shown in FIG. 3. Both legs 17a and 17b are pivotally connected through links 18 to the struts respectively. In the specific embodiment shown and as illustrated in FIG. 3, this is effected through bolts 26, bushings 29 and washers. The opposite ends of links 18 are pivotally connected to the bracket 17 by bolts 25, bushings 20 and washers.

In addition, the invention is carried out by connecting or mounting the bracket 17 to the axle 10. In the preferred embodiment shown, this is effected by pivotally mounting the longer leg 17a of the bracket about the pivot pin 16a which also serves to connect the stabilizing arm 16 to the caliper mounting bracket 7.

During use of the motorcycle, the bracket 29 will pivot relative to the axle 10, and the fork 4 and struts 3 will pivot relative to bracket 29 about pivots 15 and 14 respectively. When the front wheel 12 strikes a bump or depression in the road, the fork 4 and struts 3 will move downwardly while pivoting relative to bracket 29. However, due to the mounting of the front fender 6 to the axle 10, and the linkage connection by links 18 and 16 to the struts and fork, the fender will move upwardly relative to the latter parts to always maintain the same spacing between the front fender and the front tire.

It will thus be seen that the present invention uniquely avoids the dangerous hazard where the front tire and fender "lock-up" while at the same time the invention allows the spacing therebetween to be designed to meet aesthetic requirements.

The fender mounting linkage 16, 18 and bracket 17 may be designed to suit various tire sizes while also maintaining safety and attractive appearance.

What is claimed:

1. In a motorcycle having a fork and double struts, a wheel assembly including an axle, a hub mounted for rotation about the axle and a tire mounted to the hub between the struts and legs of the fork, and a front fender located outwardly of the tire and located between the struts and legs of the fork;

means for mounting the front fender relative to the axle such that a generally constant spacing is maintained between the tire and the fender regardless of movement of the fork and struts relative to the axle, and a caliper mounting bracket mounted about the axle and means mounting the front fender to the caliper mounting bracket.

2. The combination defined in claim 1, wherein said means for mounting the front fender to the caliper mounting bracket includes a link pivotally interconnecting the caliper mounting bracket to the fork at a pivot which also connects the fender to the caliper mounting bracket.

3. In a motorcycle having a fork and double struts, a wheel assembly including an axle, a hub mounted for rotation about the axle and a tire mounted to the hub between the struts and legs of the fork, and a front fender located outwardly of the tire and located between the struts and legs of the fork;

means for mounting the front fender relative to the axle such that a generally constant spacing is maintained between the tire and the fender regardless of movement of the fork and struts relative to the axle, and wherein said means includes:

a linkage pivotally connecting the fender to the fork and struts, said linkage including a pair of links pivotally interconnecting the fender and the struts respectively and a link pivotally interconnection the fender and the fork, and a fender bracket fixed to the fender and wherein said links are pivotally connected to said fender bracket.

4. An assembly for mounting a front fender to a motorcycle having a front wheel, fork, and double strut assemblage and maintaining said fender and said wheel at a preselected and constant radial separation;

the assembly including a bracket adapted to be fixed to the front fender, first linkage means for pivotally interconnecting the bracket and the fork, second linkage means for pivotally interconnecting the bracket and the double strut, and means for mounting the bracket in fixed radial relation to an axle of the front wheel.

5. The assembly defined in claim 4, wherein said means for mounting the bracket to the front wheel axle includes a bracket for mounting a brake caliper to the axle.

6. A method of mounting a front fender to a motorcycle at a predetermined radial spacing from the front tire in order to maintain said spacing even when the tire strikes a bump in the road during use, said method comprising the steps of;

pivotally interconnecting the fender and a double strut straddling the tire and interconnecting the fender and the axle of the front wheel of the motorcycle, wherein the step of interconnecting the fender and the front wheel axle includes the step of connecting a brake caliper mounting bracket between the fender and the axle.

7. In a motorcycle having a frame, said motorcycle comprising:
a. a front wheel having an axle and a tire;
b. a fender mounted radially outward from said tire a preselected distance;
c. a pair of elongate rockets, each said rocker having a first and second end, each said rocker having said first end pivotally mounted about said axle;
d. a fork mounted to said frame straddling said tire and having each lower of said fork pivotally mounted to said second end of each said rocker;
e. a pair of struts mounted to said frame by shock absorbing means, each said strut being pivotally mounted to one of said rockers at a point intermediate said first and second ends;

the improvement comprising:
means for mounting said fender to said motorcycle to maintain said preselected distance constant regardless of movement of said fork and said struts relative to said axle, said axle and said fender;
1) bracket means connecting said axle and said fender;
2) first link means pivotally connecting said bracket means to said struts; and
3) second link means pivotally connecting said bracket means to said fork.

8. The motorcycle of claim 7 wherein
1) said bracket means comprises a fender bracket fixed to said fender and a brake caliper bracket connecting said axle and said fender bracket;
further wherein
2) said first link means comprises a first link member pivotally connecting said fender bracket to one of said struts and a second link member pivotally connecting said fender bracket to the second of said struts and a second link member pivotally connecting said fender bracket to the second of said struts; and
3) said second link means comprises a third link member pivotally connecting said fender.

* * * * *